(12) United States Patent
Strasser et al.

(10) Patent No.: US 6,658,215 B1
(45) Date of Patent: Dec. 2, 2003

(54) ARRANGEMENT FOR MITIGATING FIRST ORDER AND SECOND-ORDER POLARIZATION MODE DISPERSION IN OPTICAL FIBER COMMUNICATION SYSTEMS

(75) Inventors: Thomas Andrew Strasser, Warren, NJ (US); Jefferson Lynn Wagener, Aberdeen, WA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/406,577

(22) Filed: Sep. 24, 1999

(51) Int. Cl.$^7$ ............................................. H04B 10/00
(52) U.S. Cl. ...................... 398/152; 385/11; 385/123; 398/158
(58) Field of Search .................. 359/161, 158, 359/177, 183, 156, 249, 140; 385/24, 113, 37, 11, 27, 28; 372/25, 29, 30; 398/158, 147, 152, 9

(56) References Cited

U.S. PATENT DOCUMENTS

| | | | |
|---|---|---|---|
| 4,953,939 A | | 9/1990 | Epworth |
| 5,587,827 A | * | 12/1996 | Hakimi et al. ............... 359/249 |
| 5,633,885 A | * | 5/1997 | Galvanauskas et al. ....... 372/25 |
| 5,930,414 A | * | 7/1999 | Fishman et al. ............ 359/140 |
| 6,104,515 A | * | 8/2000 | Cao ............................ 359/158 |
| 6,181,852 B1 | * | 1/2001 | Adams et al. ................. 385/37 |
| 6,304,691 B1 | * | 10/2001 | Espindola et al. ............ 385/24 |
| 6,385,356 B1 | * | 5/2002 | Jopson et al. ................ 359/156 |

FOREIGN PATENT DOCUMENTS

WO    WO 96 23372 A    8/1996

OTHER PUBLICATIONS

Vassallo C: "PMD Pulse Deformation", Electronics Letters, IEE Stevenage, GB, vol. 31, No. 18 Aug. 31, 1995 pp. 1597–1598 ISSN: 0013–5194, p. 1597, column 2.

Francia C et al: "Polarization Mode Dispersion in Single–Mode Optical Fibers: Time Impulse Response" ICC '99, 1999 IEEE International Conference on Communications. Conference Record, Vancouver, CA Jun. 6–10, 1999, IEEE International Conference on Communications, New York, NY: IEEE, US, vol. 3, Jun. 6, 1999, pp. 1731–1735, XP 000903666, ISBN: 0–7803–5285–8 p. 1733, column 2—p. 1734, column 1.

Ciprut P et al: "Second–Order Polarization Mode Dispersion: Impact on Analog and Digital Transmissions" Journal of Lightwave Technology, IEEE. New York, US, vol. 16, No 5, May 1, 1998 pp. 757–771, XP000772638, ISSN:0733–8724, p. 1760; table 1.

Patscher J et al: "Component for Second–Order Compensation of polarization–Mode Dispersion" Electronics Letters, IEEE Stevenage, GB, vol. 33, No. 13, Jun. 19, 1997 pp. 1157–1159, XP000734134, ISSN: 0013–5194, the Whole Document.

Noe, R., Sandel D., Yoshida–Dierolf M., Hinz S., Glingener C., Scheerer C., Schöpflin A., Fischer, G. "Fiber–Based Distributed PMD Compensation at 20 GB/s", ECOC'98, Sep. 20–24, 1998 Madrid, Spain.

\* cited by examiner

*Primary Examiner*—Nina Tong

(57) ABSTRACT

A compensation arrangement for addressing the problem of first-order and second-order polarization mode dispersion (PMD) in an optical fiber communication system includes separate, independent elements for each type of PMD. First-order PMD may be compensated using conventional techniques related to adjusting the transit time differential between the polarization states. The second-order polarization mode dispersion is compensated by recognizing the separate sources of second-order PMD (pulse broadening analogous to chromatic dispersion, additional pulse broadening due to optical filtering (narrowing), and coupling of a portion of the optical signal into the orthogonal polarization relative to the main pulse with a different transmit time. A chirped fiber grating with a variable temperature gradient, a complementary optical filter with variable spectral transmission and a polarizer, respectively, can be used to compensate for these three sources of second-order PMD.

12 Claims, 2 Drawing Sheets

INITIAL GAUSSIAN PULSE AT 1550 nm AND THE SAME PULSE
AFTER PROPAGATION THROUGH 300 km OF STANDARD FIBER.

PULSES AFTER PROPAGATING THROUGH A FIBER
WITH 1st AND 2nd ORDER PMD.

ARRANGEMENT FOR MITIGATING FIRST ORDER AND SECOND-ORDER POLARIZATION MODE DISPERSION IN OPTICAL FIBER COMMUNICATION SYSTEMS

TECHNICAL FIELD

The present invention relates to an arrangement for mitigating the effects of first- and second-order polarization mode dispersion (PMD) in optical fiber communication systems and, more particularly, to the recognition of the sources of second-order PMD and the provision of specific components that are capable of compensating for both first-order and second-order PMD.

BACKGROUND OF THE INVENTION

Polarization mode dispersion (PMD) occurs in an optical fiber as a result of a small residual birefringence that is introduced in the fiber core by asymmetric internal stress or strain as well as random polarization coupling due to external forces acting upon the fiber. In particular, PMD causes optical signal distortion as a function of time. Consequently, PMD may severely impair the transmission of a signal in an optical fiber network. Indeed, with the continued push to higher bit rates (i.e., greater than 2.5 Gb/s) in telecommunication systems, PMD is becoming a non-negligible propagation effect. So-called "single" mode fiber actually supports two modes, one for each polarization. Since in general the effective index of these two modes is not the same at any given point in a transmission system, there exists modal dispersion between the two polarizations (i.e., PMD).

It is well-known that PMD affects certain polarization components of an optical signal propagating through an optical fiber transmission line differently, such that differential time delays occur among the components as they travel through the fiber. These differential time delays may range from about 0.1 ps/(km)$^{1/2}$ for low-PMD optical fibers of modern manufacture to several ps/(km)$^{1/2}$ for single mode optical fibers of older manufacture. Disadvantageously, the differential time delay that may result over a "long distance" fiber optic link (for example, a 100 km terrestrial transmission system) may be more that 20 ps, with a 10 ps or greater delay associated with a transoceanic link employing state-of-the-art low-PMD optical fiber.

It is well-known that the differential time delay that might occur in a particular transmission fiber is not constant over time, but may vary as the physical environment of the fiber changes (e.g., temperature of the fiber, pressure upon the fiber). Thus, the statistics of time-dependent differential time delay caused by PMD in an optical fiber usually follows a Maxwellian distribution and, therefore, at any point in time, may be substantially lower to several times higher than its average (or mean) value.

Prior methods of dealing with signal impairments associated with PMD in an optical fiber include, for example: (1) electrical equalization of the signal distortion caused by PMD, as discussed in an article entitled "Experimental Equalization of Polarization Dispersion", by M. A. Santoro et al., appearing in IEEE Photonic Technology Letters, Vol. 2, No. 8, 1990, beginning at page 591; and (2) electrical compensation of the differential time delay in the received electrical signals, as discussed in the article entitled "Polarization Mode Dispersion Compensation by Phase Diversity Detection", by B. W. Hakki, appearing Photonic Technology Letters, Vol. 9, No. 1, 1997, beginning at page 121. Such prior methods also include optical compensation of the differential time delay before converting the optical signals into electrical signals, as discussed in the article "Automatic Compensation of First-Order Polarization Mode Dispersion in a 10-Gb/s Transmission System", by F. Heismann et al, appearing in the Proceedings of ECOC '98, September 1998.

While these methods are useful at addressing first-order effects, there remains in the art the need to address the impact of second-order polarization mode dispersion on optical fiber transmission systems.

SUMMARY OF THE INVENTION

The need remaining in the prior art is addressed by the present invention, which relates to an arrangement for mitigating the effects of first- and second-order-polarization mode dispersion (PMD) in optical fiber communication systems and, more particularly, to the recognition of the sources of second-order PMD and providing components that are capable of compensating for first-order and second-order PMD.

In accordance with the teachings of the present invention, first-order PMD compensation can be provided by any technique well-known in the art, such as by including a time delay arrangement that is controlled to adjust the propagation differential between the orthogonal polarization states. Second-order PMD is recognized in accordance with the present invention as associated with at least one of three distinct effects: (1) polarization dependent pulse broadening (analogous to chromatic dispersion); (2) additional pulse broadening (attributed to optical filtering); and (3) coupling of a portion of the optical signal into the orthogonal polarization (relative to the main pulse) with a different propagation time. Each one of these effects is increased when the spectral bandwidth of the optical signal is increased. In one embodiment of the present invention, therefore, second-order PMD can be minimized by minimizing the spectral bandwidth of the transmitted pulse.

In an alternative embodiment of the present invention, second-order PMD is compensated by including separate elements within the transmission system that address each of the three identified sources of second-order PMD mentioned above. For example, a chirped fiber grating with a variable temperature gradient can be used to compensate for the first type of pulse broadening that is akin to chromatic dispersion. An independent, complementary optical filter with variable spectral transmission can be inserted in the signal path to compensate for the additional pulse broadening. Lastly, an additional polarizer can be inserted in the transmission path to filter out the signal that has coupled into the unwanted polarization.

In accordance with the present invention, the various components used to provide the above-described compensation may be disposed in any suitable arrangement along the signal path. Additionally, one may sacrifice the degree of second-order compensation (if size or economy is an issue, for example) by eliminating one or two of the three separate components used for second-order PMD compensation.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
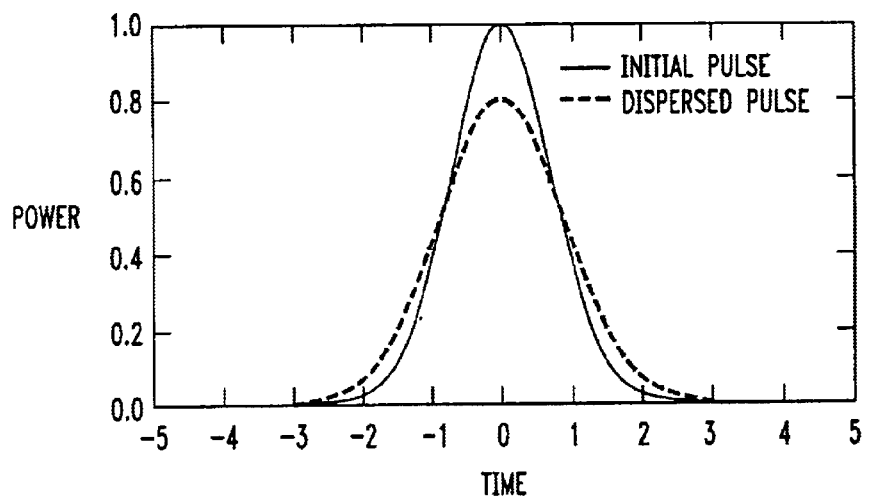
FIG. 1 is a graph illustrating an initial Gaussian pulse at 1550 nm, and the same pulse after propagation through 300 km of standard single mode fiber.

The following discussion of polarization mode dispersion will utilize a Gaussian pulse as an exemplary bit, where FIG. 1 shows both an initial Gaussian pulse and a dispersed pulse (the dispersion as a result of propagation through 300 km of standard single mode fiber). In order to better understand the effect of polarization mode dispersion on pulse propagation, it is helpful to first discuss propagation of a pulse in a fiber without any polarization effects at all. A Gaussian pulse is chosen as the desired waveform shape merely because of the simplification of the mathematics: Gaussian functions transform into Gaussian functions, and so conversion from the time domain to the frequency domain is trivial. When such a pulse propagates down a section of fiber. with chromatic dispersion, the pulse arrives as shown by the dotted line in FIG. 1. The propagation is mathematically represented very simply:

$$E(z) = e^{\beta z} E(0),$$

where it will be recalled that $\beta$ is defined as the propagation constant and can be expanded into:

$$\beta = \frac{n(\omega)\omega}{c} = -\beta_0 + \beta_1 \delta\omega + \frac{1}{2}\beta_2 \delta\omega^2 + \ldots$$

where $\beta_1$ is the inverse of the group velocity $V_g$ and $\beta_2$ is proportional to the chromatic dispersion. At a distance $z=L$, the pulse peak arrives at time $t_{max}$ defined as follows:

$$t_{max} = \beta_1 L = \frac{L}{V_g}$$

with a maximum power, $P_{max}$, reduced from the initial value $P_{initial}$ to $$P_{max} = \frac{P_{initial}}{\sqrt{1 + \frac{\beta_2^2 L^2}{\Delta t^4}}}$$

and a characteristic pulse width $\Delta t_{final}$, increased from the initial pulse width $\Delta t_{initial}$ to $$\Delta t_{final} = \Delta t_{initial} \sqrt{1 + \frac{\beta_2^2 L^2}{\Delta t_{initial}^4}}$$

For an exemplary 300 km span, the group delay $t_{max}$ is approximately 1.5 ms. For a 10 Gbit pulse, $\Delta t_{initial}$ is approximately 100 ps. In standard single mode fiber, $\beta_2$ is on the order of $-25$ ps$^2$/km, giving a final pulse width of 125 ps.

As mentioned above, single mode fibers actually propagate two distinct modes, corresponding to the two orthogonal polarizations. The description of pulse propagation described thus far has not considered this fact and, indeed, a modification of equation (1) is required to account for both polarizations. In the case of only one mode, a scalar operator can be used to describe the system, as shown above. In the case of two modes, a 2×2 matrix operator is required. In the specific case of polarizations, this 2×2 matrix referred to as a "Jones" matrix, and the associated propagation equation is:

$$\overline{E}(z) = Be^{i\beta z} \overline{E}(0).$$

In this case, E represents the electrical is a Jones vector carrying the information for both polarizations, and B is the 2×2 Jones matrix. For the purposes of the present invention, it will be presumed that B exhibits negligible, or uncorrelated polarization dependent loss (PDL), meaning that B is unitary and can be completely described by one real amplitude and three real phases. Written explicitly:

$$B = \begin{bmatrix} r(\omega)e^{i\varphi_1(\omega)} & -\sqrt{1-r^2(\omega)}\,e^{i\varphi_3(\omega)} \\ \sqrt{1-r^2(\omega)}\,e^{i\varphi_2(\omega)} & r(\omega)e^{i(\varphi_2(\omega)+\varphi_3(\omega)-\varphi_1(\omega))} \end{bmatrix}$$

Without loss of generality, the basis system can be chosen as the launched mode and an orthogonal mode. This yields, for an optical signal centered at $\omega_0$, $$E(\omega, L) \approx \begin{bmatrix} \left(r_1(\omega_0) + r_1'\delta\omega + \frac{1}{2}r_1''\delta\omega^2\right)e^{i\left(\varphi_1(\omega_0)+\varphi_1'\delta\omega+\frac{1}{2}\varphi_1''\delta\omega^2\right)} \\ \left(r_2(\omega_0) + r_2'\delta\omega + \frac{1}{2}r_2''\delta\omega^2\right)e^{i\left(\varphi_2(\omega_0)+\varphi_2'\delta\omega+\frac{1}{2}\varphi_2''\delta\omega^2\right)} \end{bmatrix} \times$$

$$e^{i\beta L} E(\omega, 0),$$

where $r_1(\omega)$ and $r_2(\omega)$ are not independent, but are related by the unitary condition $r_1^2 + r_2^2 = 1$. Note that this expansion of B has terms that are readily identifiable. The first and second derivatives of r are broadening terms, while the first derivative of $\phi$ is a change in the group velocity and the second derivative of $\phi$ equivalent to chromatic dispersion. Without any correction made to the effects of polarization mode dispersion within the fiber, all of these effects are present. In general, $\phi_1'$ and $\phi_2'$ are not equal. They translate to a difference in transit times for the two different output polarizations. This difference in transit time, usually measured in picoseconds (ps), is then defined as "first-order" polarization mode dispersion (PMD).

Since B is a standard 2×2 matrix, the eigenstates of the matrix can be determined for a given frequency $\omega_0$. By launching the eigenstate of B at frequency $\omega_0$, B is diagonalized at the center frequency. Keeping the lower order terms in r yields:

$$E(\omega, L) \approx \begin{bmatrix} \left(1 + \frac{1}{2}r_1''\delta\omega^2\right)e^{i\left(\varphi_1(\omega_0)+\varphi_1'\delta\omega+\frac{1}{2}\varphi''\delta\omega^2\right)} \\ \left(\sqrt{-r_1''}\,\delta\omega\right)e^{i(\varphi_2(\omega_0)+\varphi_2'\delta\omega)} \end{bmatrix} e^{i\beta L} E(\omega, 0).$$

In this simplified form, it can be seen that to the first order, all the output is associated with a single polarization state, and that state is only delayed in time by the first order correction. All other terms in this expression are second-order in this expansion and will be discussed separately below.

Figure 2:
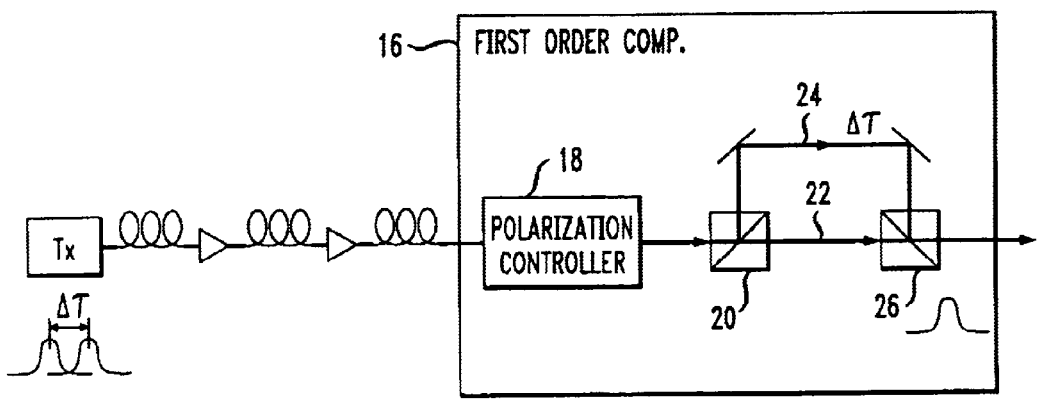
FIG. 2 illustrates a conventional prior art fiber optic transmission path including an arrangement for providing first-order PMD compensation.

FIG. 2 illustrates an exemplary prior art system including an optical delay section used to adjust the difference in transit times to overcome the presence of the first-order portion of the PMD. Referring to FIG. 2, an optical signal launched by a transmitter 10 propagates through an optical fiber transmission system 12, which may include a number of amplifying devices 14 if the span is sufficiently long. At a predetermined distance from the transmitter (for example, 300 km), a first-order PMD compensator 16 may be disposed. As shown in FIG. 2, by the time an exemplary pulse reaches first-order PMD compensator 16, the orthogonal polarizations may have a difference in transit times of $\Delta\tau$. This difference is removed by first passing the pulses through a polarization controller 18, which functions to align the polarization of the two distinct pulses with the subsequent beam splitter axes. The two orthogonal pulses next pass through a first polarization beam splitter 20 which functions to de-couple the two polarizations, sending a first polarization along signal path 22, and the remaining polarization along signal path 24. As shown in FIG. 2, signal path 24 is designed to exhibit an optical path length that is $\Delta\tau$ greater than signal path 22. Therefore, when the two signals are re-combined in a second polarization beam splitter 26, the additional delay associated with path 24 will result in the two polarizations essentially overlapping in time at the output of second polarization beam splitter 26, effectively removing the presence of the first-order polarization mode dispersion.

While this arrangement is sufficient in removing most, if not all, of the first-order polarization mode dispersion, the effects of second-order PMD are still present. Realizing that $r_1''$ is negative by the above-defined unitary condition (see equation (9)), the effects of second-order PMD can be examined. First, upon inspect of the above simplification, it can be seen that the additional pulse broadening due to $\phi_1''$ is of the well-known form associated with chromatic dispersion. In fact, upon detection it is difficult to discern if this particular broadening is due to chromatic dispersion or PMD Therefore, the second-order effect associated with this portion of the pulse broadening can be compensated by the same methods used to remove chromatic dispersion from optical transmission. Another second-order effect is additional pulse broadening due to optical filtering. That is, the power in the original signal has been reduced by the presence of $r_1''$. More particularly, the optical spectrum has been narrowed by a bandpass filter centered $\omega_0$. An independent, complementary filter can therefore be used to nullify this effect. Lastly, there is now power present in the orthogonal polarization, where this pulse has significantly different shape and is delayed with respect to the original pulse. The addition of a polarizer can be used to discard the unwanted polarization.

Figure 3:
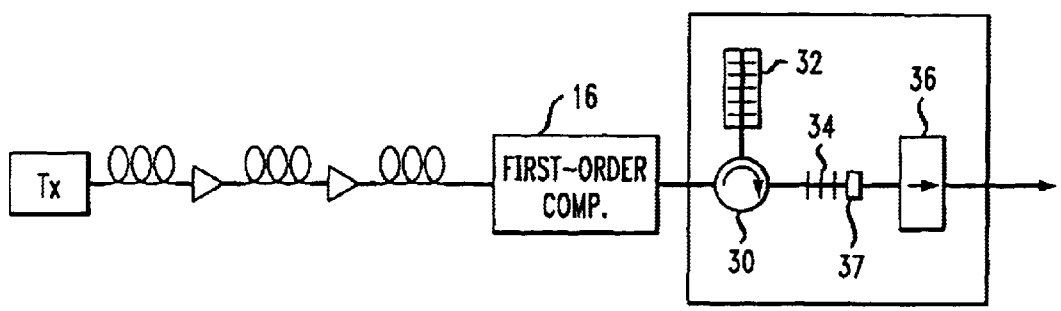
FIG. 3 illustrates an exemplary arrangement of the present invention capable of compensating for both first-order and second-order PMD.
Figure 4:
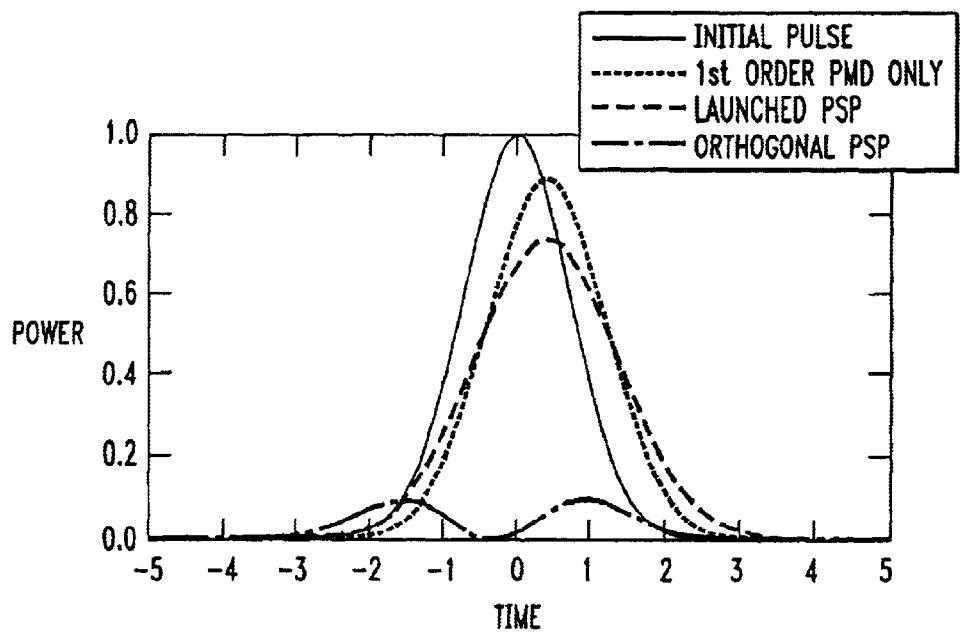
FIG. 4 is a graph illustrating both first-order and second-order PMD.

FIG. 3 illustrates an compensator of the present invention which provides both first-order and second-order polarization mode dispersion. The components associated with the provisioning of the first-order PMD compensation are identical to those shown in FIG. 2 and need not be reviewed. In accordance with the present invention, the various aspects of second-order polarization mode dispersion can be compensated by including additional elements, each element, associated with a separate source of second-order PMD. Referring to FIG. 3, a circulator 30 is shown as disposed beyond second polarization beam splitter 26 and functions to couple the optical signal into the components associated with second-order compensation.

In particular, circulator 30 and a chirped fiber grating 32 are shown in FIG. 3 and are used to remove the additional pulse broadening that appears identical to "chromatic" dispersion. Chirped fiber grating 32 exhibits a dispersion that can be controlled as a function of temperature and is therefore capable of providing a dynamic, adjustable dispersion compensation. One exemplary type of such a dynamic chirped fiber grating is disclosed in Ser. No. 09/183,048 and is herein incorporated by reference.

A variable spectral transmission optical filter 34 is disposed beyond grating 32 and functions to provide a "complement" to the filter causing the additional pulse broadening present in the second-order PMD. This variable width notch filter can be adjusted dynamically as the spectral width of the bandpass filter effect changes in the system. A polarization controller 37 is then used to maximize the power through a polarizer 36, included to remove essentially all of the power that has been coupled into the unwanted component of the optical signal. It is to be understood that these three components of second-order PMD are independent and, as such, any one (or two) of the compensation elements can be eliminated while still providing a degree of second-order PMD compensation. Ideally, the order of these components is not fixed and they may, in general, be placed in any suitable sequence. However, the polarization dependent properties of particular components may suggest a preferred order to avoid polarization-dependent transmission.

It is to be understood that while Gaussian expressions were used to define the pulses discussed above, the results and conclusions concerning the B matrix are very general and can be used with any suitable amplitude-modulated format. In fact, it has been found that by using either duobinary or NRZ transmission, second-order PMD will be "automatically" reduced, since both of these schemes use relatively narrow spectral bandwidth signals. In general, the foregoing is merely illustrative of the principles of the present invention. Those skilled in the art will be able to devise numerous arrangements, which, although not explicitly shown or described herein, nevertheless embody those principles that are within the spirit and scope of the present invention.

What is claimed is:

1. Apparatus for compensating for the effects of first-order and second-order polarization mode dispersion in an optical fiber transmission system, the apparatus comprising:

a first-order polarization mode dispersion compensation arrangement responsive to an input optical signal for minimizing the transit time delay between a first polarization component of said input optical signal and a second, orthogonal polarization component of said input optical signal;

a second-order polarization mode dispersion compensation arrangement, coupled to the output of the first-order polarization mode dispersion compensation arrangement, said second-order polarization. mode dispersion compensation arrangement comprising at least two of the following elements:

a dynamically adjustable dispersion compensation element for essentially eliminating pulse broadening of said optical signal; and an adjustable width optical notch filter exhibiting a center frequency associated with the frequency of said optical signal; and a controllable polarizer for eliminating any optical signal remaining in the second, orthogonal polarization.

2. Apparatus as defined in claim 1 wherein the dynamically adjustable dispersion compensation element comprises a chirped fiber grating exhibiting a variable temperature gradient.

3. Apparatus as defined in claim 1 wherein the dynamically adjustable dispersion compensation element comprises a chirped fiber grating exhibiting a variable strain gradient.

4. Apparatus as defined in claim 1 wherein the second-order polarization mode dispersion arrangement comprises the following elements:

a dynamically adjustable dispersion compensation element for essentially eliminating pulse broadening of said optical signal; and an adjustable optical notch filter exhibiting a center frequency associated with the frequency of said optical signal; and a controllable polarizer for eliminating any optical signal remaining in the second, orthogonal polarization.

5. An arrangement for compensating for second-order polarization mode dispersion in an optical signal propagating in an optical fiber transmission system, the optical signal defined as single mode and comprising a first polarization state and a second, orthogonal polarization state, the arrangement comprising at least two of the following elements:

a dynamically adjustable dispersion compensation element for essentially eliminating pulse broadening of said input optical signal; and an adjustable optical notch filter exhibiting a center frequency associated with the frequency of said input optical signal; and a controllable polarizer for eliminating any optical signal remaining in the second, orthogonal polarization.

6. An arrangement as defined in claim 5 wherein the arrangement comprises the following elements:

a dynamically adjustable dispersion compensation element for essentially eliminating pulse broadening of said input optical signal; and an adjustable optical notch filter exhibiting a center frequency associated with the frequency of said input optical signal; and a controllable polarizer for eliminating any optical signal remaining in the second, orthogonal polarization.

7. An optical communication system including apparatus for compensating for the effects of first-order and second-order polarization mode dispersion within the system optical fiber, the apparatus comprising:

a first-order polarization mode dispersion compensation arrangement responsive to an input optical signal for minimizing the transit time delay between a first polarization component of said input optical signal and a second, orthogonal polarization component of said input optical signal;

a second-order polarization mode dispersion compensation arrangement, coupled to the output of the first-order polarization mode dispersion compensation arrangement, said second-order polarization mode dispersion compensation arrangement comprising at least two of the following elements:

a dynamically adjustable dispersion compensation element for essentially eliminating pulse broadening of said optical signal; and an adjustable width optical notch filter exhibiting a center frequency associated with the frequency of said optical signal; and a controllable polarizer for eliminating any optical signal remaining in the second, orthogonal polarization.

8. Apparatus as defined in claim 7 wherein the dynamically adjustable dispersion compensation element comprises a chirped fiber grating exhibiting a variable temperature gradient.

9. Apparatus as defined in claim 7 wherein the dynamically adjustable dispersion compensation element comprises a chirped fiber grating exhibiting a variable strain gradient.

10. Apparatus as defined in claim 7 wherein the second-order polarization mode dispersion arrangement comprises the following elements:

a dynamically adjustable dispersion compensation element for essentially eliminating pulse broadening of said optical signal; and an adjustable optical notch filter exhibiting a center frequency associated with the frequency of said optical signal; and a controllable polarizer for eliminating any optical signal remaining in the second, orthogonal polarization.

11. An optical communication system including an arrangement for compensating for second-order polarization mode dispersion in an optical signal propagating in said system, the optical signal defined as single mode and comprising a first polarization state and a second, orthogonal polarization state, the arrangement comprising at least two of the following elements:

a dynamically adjustable dispersion compensation element for essentially eliminating pulse broadening of said input optical signal; and an adjustable optical notch filter exhibiting a center frequency associated with the frequency of said input optical signal; and a controllable polarizer for eliminating any optical signal remaining in the second, orthogonal polarization.

12. An arrangement as defined in claim 11 wherein the arrangement comprises the following elements:

a dynamically adjustable dispersion compensation element for essentially eliminating pulse broadening of said input optical signal; and an adjustable optical notch filter exhibiting a center frequency associated with the frequency of said input optical signal; and a controllable polarizer for eliminating any optical signal remaining in the second, orthogonal polarization.

* * * * *